(12) United States Patent
Zhu et al.

(10) Patent No.: US 12,478,387 B2
(45) Date of Patent: Nov. 25, 2025

(54) SCREW PLACEMENT SYSTEM AND VERTEBRAL PEDICLE SCREW PLACEMENT DEVICE

(71) Applicant: SHENZHEN FUTURTEC MEDICAL CO., LTD., Shenzhen (CN)

(72) Inventors: Shengxiao Zhu, Shenzhen (CN); Linzhi Shi, Shenzhen (CN); Jiarui Chen, Shenzhen (CN); Tao Zhang, Shenzhen (CN)

(73) Assignee: SHENZHEN FUTURTEC MEDICAL CO., LTD., Shenzhen (CN)

( * ) Notice: Subject to any disclaimer, the term of this patent is extended or adjusted under 35 U.S.C. 154(b) by 1011 days.

(21) Appl. No.: 17/620,663

(22) PCT Filed: Jul. 6, 2020

(86) PCT No.: PCT/CN2020/100480
§ 371 (c)(1),
(2) Date: Dec. 17, 2021

(87) PCT Pub. No.: WO2022/006717
PCT Pub. Date: Jan. 13, 2022

(65) Prior Publication Data
US 2022/0354510 A1  Nov. 10, 2022

(51) Int. Cl.
*A61B 17/17* (2006.01)
(52) U.S. Cl.
CPC .................................. *A61B 17/17* (2013.01)

(58) Field of Classification Search
CPC . A61B 17/17; A61B 17/1757; A61B 17/1622; A61B 17/164
See application file for complete search history.

(56) References Cited

U.S. PATENT DOCUMENTS

| 5,078,140 A | 1/1992 | Kwoh |
| 2013/0172903 A1 | 7/2013 | Suarez et al. |

(Continued)

FOREIGN PATENT DOCUMENTS

| CN | 201847767 U | 6/2011 |
| CN | 104887312 A | 9/2015 |

(Continued)

*Primary Examiner* — Zade Coley
*Assistant Examiner* — Diana Jones
(74) *Attorney, Agent, or Firm* — Cheng-Ju Chiang

(57) ABSTRACT

The vertebral pedicle screw placement device of the present application includes a bone drill mechanism and a depth advancing mechanism connected to the bone drill mechanism and used to generate linear reciprocating motion. The bone drill mechanism includes a bone drill driving device and a clamping mechanism connected and driven by the bone drill driving device. The present application provides the driving force of the linear reciprocating motion of the bone drill mechanism through a depth advancing mechanism, and combines the driving control of the clamping mechanism by the bone drill driving device. The clamping mechanism is used to clamp the guide pins, reamers, taps, vertebral pedicle screws, etc. required in the operation, so as to realize the screw placement in the operation, improve the operation efficiency and the accuracy of the screw placement, and avoid possible accidental injuries in the manual screw placement process in the prior art.

18 Claims, 5 Drawing Sheets

(56) References Cited

U.S. PATENT DOCUMENTS

| | | | |
|---|---|---|---|
| 2014/0189508 A1 | 7/2014 | Granchi et al. | |
| 2018/0092648 A1* | 4/2018 | Sun | B25J 11/00 |
| 2018/0344409 A1* | 12/2018 | Bonny | A61B 34/20 |
| 2022/0354510 A1* | 11/2022 | Zhu | A61B 17/1671 |

FOREIGN PATENT DOCUMENTS

| | | |
|---|---|---|
| CN | 204863476 U | 12/2015 |
| CN | 205831866 U | 12/2016 |
| CN | 205903308 U | 1/2017 |
| CN | 206026424 U | 3/2017 |

\* cited by examiner

SCREW PLACEMENT SYSTEM AND VERTEBRAL PEDICLE SCREW PLACEMENT DEVICE

CROSS REFERENCE TO RELATED APPLICATIONS

The present application is a 35 U.S.C. § 371 National Phase conversion of International (PCT) Patent Application No. PCT/CN2020/100480, filed on Jul. 6, 2020, the disclosure of which is incorporated by reference herein. The PCT International Patent Application was filed in Chinese.

TECHNICAL FIELD

This application relates to the technical field of medical devices, and in particular to a semi-automatic screw placement system and a vertebral pedicle screw placement device, which can be used to place vertebral pedicle screws in orthopedic surgery.

BACKGROUND

The operation of vertebral pedicle screw placement is a very common operation. Vertebral pedicle screw plays an important role in the treatment of spinal trauma reduction and deformity correction. The key to the success of the vertebral pedicle screw internal fixation surgery is whether the screw can be accurately inserted through the vertebral pedicle without damaging the nerve vertebral body.

Currently, there is no automatic or semi-automatic vertebral pedicle screw placement tool that can be directly used for orthopedic surgical robots. The currently known orthopedic surgical robots are only used for navigation and positioning to the lesion, and the screw is manually placed by the doctor, or use an orthopedic electric drill to manually insert the screw. When the doctor manually taps and inserts the screw, the doctor needs to exert a lot of physical effort. In addition, due to the high hardness of cortical bone, doctors often need to use hammers and other tools to strike when manually reaming. This operation causes relatively large impact on the human body and is prone to accidental injuries. In addition, when screwing the screw manually, the final tightening torque cannot be effectively controlled. When using a low-speed bone drill for tapping and screw placement, the doctor lacks the feel of manual screwing, and it is difficult to judge whether the screw is in place. Although setting a navigation marker on the end of tools such as tapping tools and low-speed bone drills can track the position of the tip of the tool in the bone in real time, but due to human response and physiological fatigue, there will be a delay, resulting in inaccurate depth.

Therefore, there is a need to provide a vertebral pedicle screw placement device, which is convenient and easy to operate, provides precise placement of screw, can improve surgical efficiency, and reduce surgical injuries.

Technical Problems

The purpose of this application is to provide a medical screw placement system and a vertebral pedicle screw placement device which is convenient and easy to operate and provides precise placement of screw.

Technical Solutions

In order to achieve the purpose of this application, the following technical solution is provided:

A vertebral pedicle screw placement device is provided, which includes a bone drill mechanism and a depth advancing mechanism connected to the bone drill mechanism and used to generate linear reciprocating motion. The bone drill mechanism includes a bone drill driving device and a clamping mechanism connected and driven by the bone drill driving device. The present application provides the driving force of the linear reciprocating motion of the bone drill mechanism through a depth advancing mechanism, and combines the driving control of the clamping mechanism by the bone drill driving device. The clamping mechanism is used to clamp the guide pins, reamers, taps, vertebral pedicle screws, etc. required in the operation, so as to realize the screw placement in the operation, improve the operation efficiency and the accuracy of the screw placement, and avoid possible accidental injuries in the manual screw placement process in the prior art.

In some embodiments, the depth advancing mechanism can be realized in this way. The depth advancing mechanism comprises a lead screw assembly, a moving platform, and a driving motor for driving the lead screw assembly; the lead screw assembly includes a ball screw and a lead screw nut; the driving motor is connected to and drives the ball screw, so that a linear reciprocating relative movement occurs between the lead screw nut and the ball screw; the lead screw nut is connected with the moving platform, and the bone drill mechanism is installed on the moving platform.

In some embodiments, the depth advancing mechanism further includes a linear guide rail and a sliding block, the sliding block can perform linear reciprocating relative movement along the linear guide rail, the relative position of the ball screw and the linear guide rail is fixed, and the lead screw nut is fixed on the sliding block. Specifically, the depth advancing mechanism further includes a coupling, and the driving motor drives the ball screw through the coupling to perform linear reciprocating motion. Specifically in some embodiments, the depth advancing mechanism further includes a bottom plate, the linear guide rail is fixedly installed with the bottom plate, a bearing is provided on the bottom plate, and the ball screw is installed in the bearing. In some embodiments, the depth advancing mechanism further includes a platform connector fixed on the lead screw nut, and the moving platform is installed on the platform connector. In some embodiments, the depth advancing mechanism further includes a platform connector fixed on the lead screw nut, and the moving platform is installed on the platform connector.

In other embodiments, the depth advancing mechanism can also adopt a method other than the lead screw assembly to achieve linear reciprocating motion. For example, the connecting member is directly driven by a driving motor to reciprocate linearly along the sliding rail, and the connecting member is used to connect the bone drill mechanism. In addition, the movement displacement can be detected by the sensor, and the accuracy of the movement can be controlled by the computer.

Further, in some embodiments, the vertebral pedicle screw placement device further includes a pressure sensor and a buffer spring arranged between the bone drill mechanism and the moving platform of the depth advancing mechanism. the pressure sensor completes the real-time pressure measurement, and can measure the resistance of the screw placement tool during the advancement process in each process of screw placement, so as to avoid the occurrence of surgical accidents. The spring is used to adjust the slight displacement difference generated during screw placement. Specifically, the pressure sensor can be fixed on the moving platform, and the different displacements of the mechanism mounting seat relative to the moving platform produce different pressures on the pressure sensor, so different readings are displayed.

In some embodiments, the bone drill mechanism further includes a mechanism mounting seat and a cross-roller guide rail; the bone drill driving device and the clamping mechanism are mounted on the mechanism mounting seat; the cross-roller guide rail is connected to the moving platform on the depth advancing mechanism; and the bone drill driving device and the clamping mechanism are connected with the moving platform through the mechanism mounting seat and the cross-roller guide rail. In an embodiment, the bone drill driving device adopted by the bone drill mechanism is a bone drill motor.

In some embodiments, a torque sensor is provided between the bone drill driving device and the clamping mechanism. The torque sensor can accurately measure the torque of the vertebral pedicle screw during the entire insertion process, thereby intelligently judging whether the screw has been inserted in place, so as to avoid the loosening of the screw in the vertebral pedicle due to not being fastened, and avoid breaking of the vertebral pedicle.

In some embodiments, the clamping mechanism is a guide pin clamping mechanism, which includes a clamping mechanism body and a drill chuck, the clamping mechanism body is connected with the bone drill driving device, and the drill chuck is used for clamping a guide pin. In some embodiments, a torque sensor is connected between the clamping mechanism body and the bone drill driving device. In a specific embodiment, the clamping mechanism body is connected with the torque sensor through a screw.

In some embodiments, the clamping mechanism is a multifunctional clamping mechanism, which includes a clamping mechanism body and a quick release joint, and the clamping mechanism body is connected with the bone drill driving device. A reamer, a tap and a screw placement driver can be quickly connected to the clamping mechanism body through the quick-release joint. In some embodiments, the torque sensor is connected between the clamping mechanism body and the bone drill driving device. In a specific embodiment, the clamping mechanism body is connected with the torque sensor through a screw.

In some embodiments, the vertebral pedicle screw placement device also includes a guide pin fixing mechanism for positioning a guide pin, which can clamp the guide pin during the process of reaming, tapping and screw placement, and can be used in the process of placing the screw, and which can prevent the guide pin from being carried in by the reamer and other screw placement tools during the screw placement process, and then pierce the vertebral body and cause damage to other organs of the human body. In some embodiments, the guide pin fixing mechanism includes a fixing member, an extension arm, and a clamping arm, the fixing member and the depth advancing mechanism are relatively fixedly mounted, one end of the extension arm is mounted on the fixing member, and the clamping arm is mounted on the other end of the extension arm through a connecting shaft, the clamping arm is rotatable along the connecting shaft relative to the extension arm, and the clamping arm is provided with a clamping hole for clamping the guide pin.

In some embodiments, the guide pin fixing mechanism further includes adjusting members respectively arranged on one side of the connecting shaft and the clamping hole. The adjustment member adopts a threaded fitting structure which adjusts the feed depth by rotating, thereby adjusting the tightness of clamping a guide pin.

In some embodiments, a cross laser system 220 and a binocular camera 600 are provided. The cross laser system 220 is installed at the front end of the depth advancing mechanism, which can provide the doctor with an accurate position of the patient's skin incision. The vertebral pedicle screw placement device also includes a cross laser system, which can provide the doctor with an accurate position of the patient's skin incision. The cross laser system may be installed at the front end of the depth advancing mechanism.

In some embodiments, the vertebral pedicle screw placement device further includes a control circuit for controlling the screw placement operation of the vertebral pedicle screw placement device and at the same time detecting the screw placement situation. Specifically, the control circuit can be connected to the computer through RSS485 or CAN communication, and control various movements of the tool according to the preoperative planning.

In some embodiments, the vertebral pedicle screw placement device further includes an installation interface, which can install the vertebral pedicle screw placement device on a mechanical arm of an orthopedic surgical robot to realize intelligent semi-automatic screw placement operation.

In some embodiments, the vertebral pedicle screw placement device also includes a binocular camera, which is installed at the front end of the depth advancing mechanism and connected to a computer to perform tracking, identification and intraoperative monitoring.

In other embodiments, the binocular camera may not be set on the vertebral pedicle screw placement device, but may be separately set on other brackets (floor bracket or a bracket fixed to the side of the operating table) and connected to the computer. The clamping mechanism of the bone drill mechanism is provided with a navigation surface, and the navigation surface is provided with a visible light visual recognition tracking pattern adapted to the binocular vision system. Tracking and monitoring is achieved by tracking the navigation surface on the intelligent vertebral pedicle screw placement device.

The present application also provides a vertebral pedicle screw placement system, which includes the vertebral pedicle screw placement device and binocular vision system as described above, and a computer, and the binocular vision system is connected to the computer.

Specifically, the binocular vision system includes the binocular camera for spatial positioning of binocular vision, and the binocular camera is connected to the computer. The clamping mechanism of the bone drill mechanism of the vertebral pedicle screw placement device is provided with a navigation surface, and the navigation surface is provided with a visible light visual recognition tracking pattern adapted to the binocular vision system. Tracking and monitoring is achieved by tracking the navigation surface on the intelligent vertebral pedicle screw placement device.

Beneficial Effects

Compared with the prior art, this application has the following advantages:

In the solution of the present application, it provides the driving force of the linear reciprocating motion of the bone drill mechanism through a depth advancing mechanism, and combines the driving control of the clamping mechanism by the bone drill driving device. The clamping mechanism is used to clamp the guide pins, reamers, taps, vertebral pedicle screws, etc. required in the operation, so as to realize the screw placement in the operation. When the vertebral pedicle screw placement device of the present application is used for surgical screw placement operation, the screw placement process is stable, and the impact on the human body caused by manual screw placement is small, the operation efficiency and screw placement accuracy are improved, and it can avoid possible accidental injuries in manual screw placement.

The vertebral pedicle screw placement device is also provided with a pressure sensor which completes the real-time pressure measurement, and can measure the resistance of the screw placement tool during the advancement process in each process of screw placement, so as to avoid the occurrence of surgical accidents. The spring is used to adjust the slight displacement difference generated during screw placement. A torque sensor is arranged between the bone drill driving device and the clamping mechanism. The torque sensor can accurately measure the torque of the vertebral pedicle screw during the entire insertion process, thereby intelligently judging whether the screw has been inserted in place, so as to avoid the loosening of the screw in the vertebral pedicle due to not being fastened, and improve the success rate and accuracy of surgery.

The vertebral pedicle screw placement device of the present application can also be fixed to the orthopedic surgery robot arm through an installation interface. The parameters of each step of vertebral pedicle screw placement can be accurately controlled according to the preoperative surgical plan, which reduces the deviation caused by manual operation, ensures the accuracy of the operation, and reduces the labor intensity of the doctor.

The screw placement system of the present application combines the vertebral pedicle screw placement device with a binocular vision system and a computer to form a complete surgical operating system, and realizes the intelligent orthopedic surgery screw placement operation. The intelligent orthopedic surgery screw placement operation is realized, and the operation condition of the intelligent vertebral pedicle screw placement device can be tracked through the binocular vision system for tracking and monitoring, which improves the accuracy of screw placement and reduces the risk of surgery.

DETAILED DESCRIPTION

Figure 9:
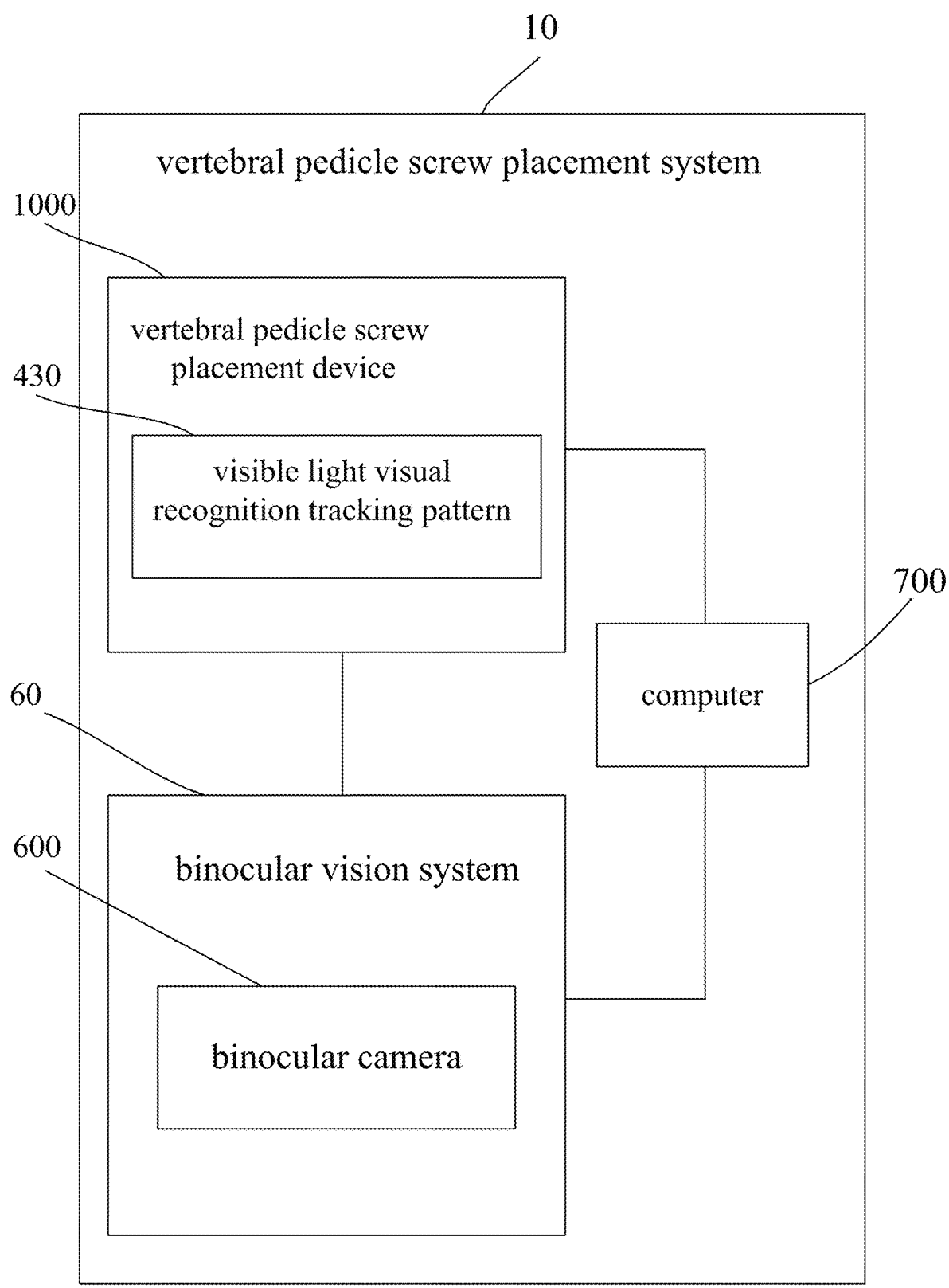

FIG. 9 is a block diagram of a vertebral pedicle screw placement system in accordance with an embodiment of the present invention.

Please refer to FIGS. 1 to 6. A vertebral pedicle screw placement device 1000 of the present application includes a bone drill mechanism 400, and a depth advancing mechanism 100 connected to the bone drill mechanism 400 and used to generate linear reciprocating motion. The bone drill mechanism 400 includes a bone drill driving device and a clamping mechanism connected to and driven by the bone drill driving device. Specifically, the bone drill driving device may adopt a driving motor. In the present application, the driving force of the bone drill mechanism 400 for linear reciprocating motion is provided by the depth advancing mechanism 100, and the driving of the clamping mechanism is controlled in combination with the bone drill driving device. The clamping mechanism is used to clamp the guide pins, reamers, taps, vertebral pedicle screws, etc. required in the operation, so as to realize the screw placement in the operation, improve the operation efficiency and the accuracy of the screw placement, and avoid possible accidental injuries in the manual screw placement process in the prior art.

Figure 1:
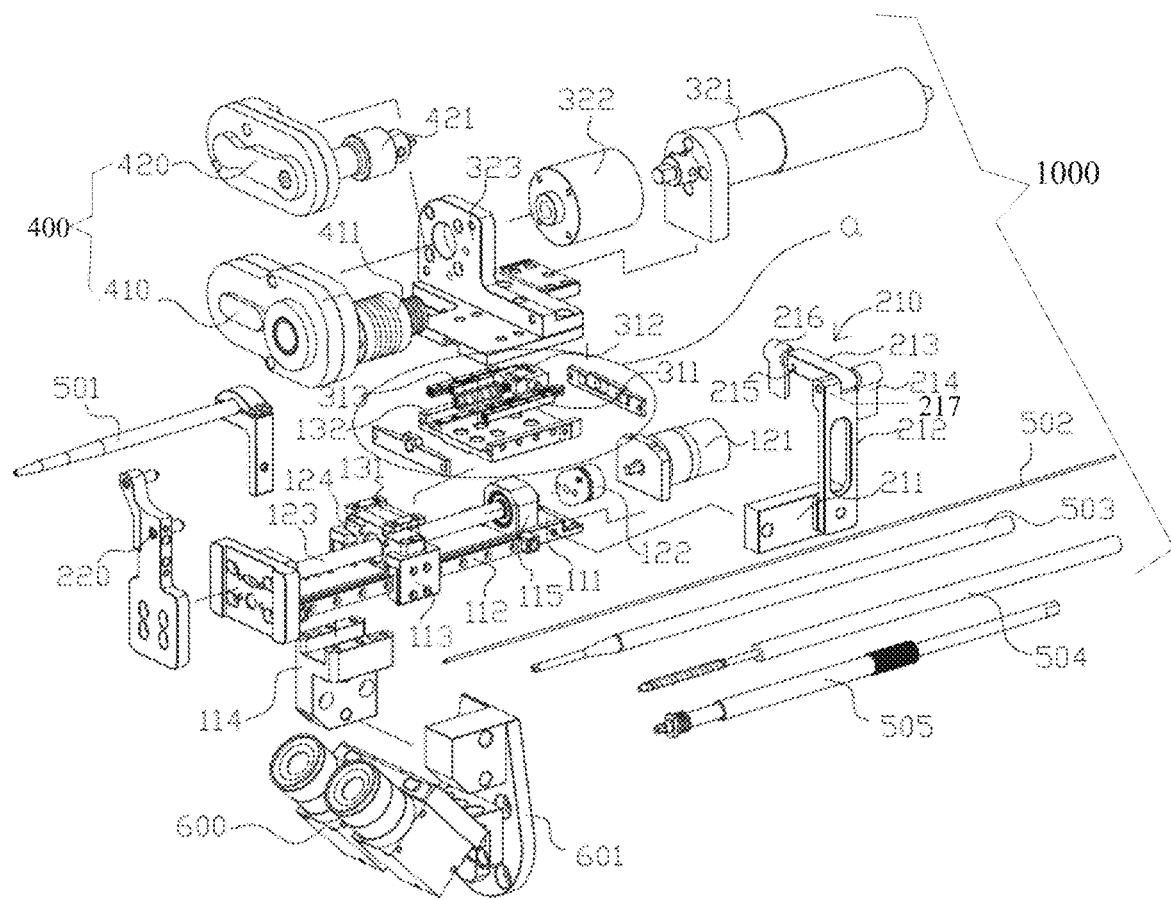
FIG. 1 is an exploded schematic diagram of each component of the vertebral pedicle screw placement device of the application.
Figure 2:
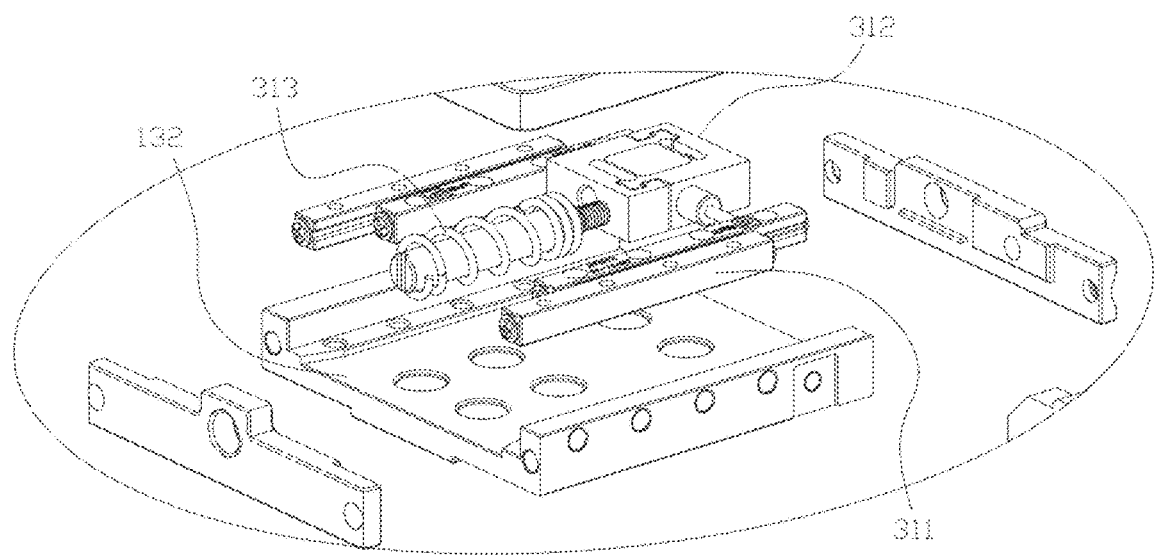
FIG. 2 is an enlarged view of part a in FIG. 1.

Please refer to FIG. 1. In this embodiment, the depth advancing mechanism 100 can be implemented in such a way that the depth advancing mechanism 100 includes a lead screw assembly, a linear guide rail 112, a sliding block 113, a bottom plate 111, a moving platform 132, and a driving motor that drives the lead screw assembly 121. The lead screw assembly includes a ball screw 123 and a lead screw nut 124. The linear guide rail 112 is fixedly installed with the bottom plate 111, the bottom plate 111 is provided with a bearing 115, and the ball screw 123 is installed in the bearing. Therefore, the relative position of the ball screw 123 and the linear guide rail 112 is fixed, but at the same time it can rotate relatively in the bearing. The sliding block 113 can perform linear reciprocating relative movement along the linear guide rail 112, and the lead screw nut 124 is fixed on the sliding block 113. The driving motor 121 is connected to the ball screw 123 through a coupling 122 and drives the ball screw 123 to rotate, so that the lead screw nut 124 and the ball screw 123 generate a linear reciprocating relative movement. The lead screw nut 124 and the sliding block 113 reciprocate together along the linear guide rail 112.

A platform connector 131 is provided on the lead screw nut 124, the lead screw nut 124 is connected to the moving platform 132 through the platform connector 131, and the bone drill mechanism 400 is installed on the moving platform 132.

In other embodiments, the depth advancing mechanism 100 can also adopt a method other than the lead screw assembly to generate linear reciprocating motion, for example, a driving motor directly drives the connector to move linearly along the slide rail, and the connector is used to connect the bone drill mechanism 400. Moreover, the movement displacement can be detected by a sensor, and the accuracy of the movement can be controlled by a computer 700.

In an embodiment, the bone drill driving device adopted by the bone drill mechanism 400 is a bone drill motor 321, and a torque sensor 322 is provided between the bone drill motor 321 and the clamping mechanism. The torque sensor 322 can accurately measure the torque of the vertebral pedicle screw during the entire insertion process, thereby intelligently judging whether the screw has been inserted in place, so as to avoid the loosening of the screw in the vertebral pedicle due to not being fastened, and avoid breaking of the vertebral pedicle. The bone drill motor 321 and the clamping mechanism are mounted on a mechanism mounting seat 323, and the moving platform 132 on the depth advancing mechanism 100 is connected with a cross-roller guide rail 311. The bone drill motor 321 and the clamping mechanism are connected to the moving platform 132 through the mechanism mounting seat 323 and the cross-roller guide rail 311.

The vertebral pedicle screw placement device 1000 further includes a pressure sensor 312 and a buffer spring 313 arranged between the bone drill mechanism 400 and the moving platform 132 of the depth advancing mechanism 100. Here, the pressure sensor 312 completes the real-time pressure measurement, and can measure the resistance of the screw placement tool during the advancement process in each process of screw placement, so as to avoid the occurrence of surgical accidents. The spring 313 is used to adjust the slight displacement difference generated during screw placement.

The vertebral pedicle screw placement device 1000 also includes a guide pin fixing mechanism for positioning a guide pin, which can clamp the guide pin during the process of reaming, tapping and screw placement, and can be used in the process of placing the screw, and which can prevent the guide pin from being carried in by the reamer and other screw placement tools during the screw placement process, and then pierce the vertebral body and cause damage to other organs of the human body. Specifically, the guide pin fixing mechanism 210 includes a fixing member 211, an extension arm 212, and a clamping arm 213. The fixing member 211 is fixedly installed relative to the depth advancing mechanism 100, and can be specifically installed on a lateral side or a lateral side of the bottom plate 111 of the linear guide rail 112. One end of the extension arm 212 is mounted on the fixing member 211, and the clamping arm 213 is mounted on the other end of the extension arm 212 via a connecting shaft 217. In addition, the clamping arm 213 is rotatable along the connecting shaft 217 relative to the extension arm 212, and the clamping arm 213 defines therein a clamping hole 215 for clamping the guide pin.

In a specific embodiment, one side of the connecting shaft 217 of the clamping arm 213 and the extension arm 212 is provided with an adjusting member 214, and the adjusting member 214 adopts a threaded fitting structure. The adjusting member 214 located at the connecting shaft 217 adjusts the tightness of the clamping arm connection by rotating, so as to fix the angle of the clamping arm 213 relative to the extension arm 212. An adjustment member 216 is also provided on one side of the clamping hole 215, and the adjustment member 216 adopts a threaded fitting structure which adjusts the feed depth by rotating, thereby adjusting the tightness of clamping a guide pin 502.

There are different embodiments of the clamping mechanism of the bone drill mechanism 400, for example, a guide pin clamping mechanism or a three-in-one multifunctional clamping mechanism of reaming/tapping/screw setting.

Figure 3:
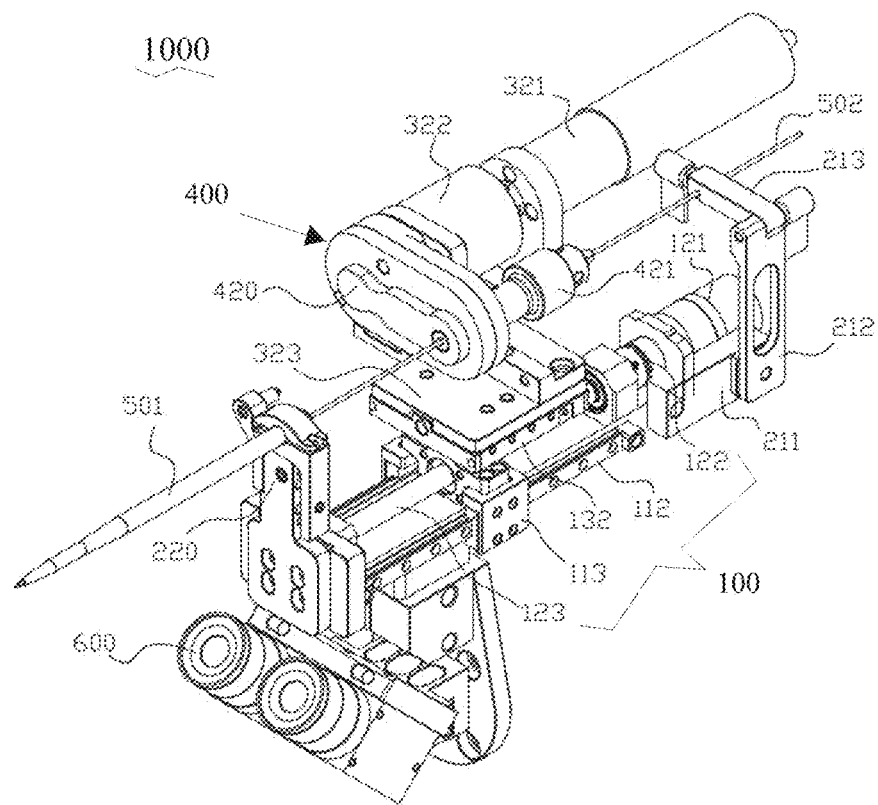
FIG. 3 is a schematic diagram of Embodiment 1 of the vertebral pedicle screw placement device of this application.

As shown in FIG. 3, the clamping mechanism is a guide pin clamping mechanism, which includes a clamping mechanism body 420 and a drill chuck 421. The clamping mechanism body 420 is connected to the torque sensor 322 and the bone drill motor 321. The drill chuck 421 is used to clamp the guide pin 502, and a front end of the guide pin 502 is inserted into a guide tube 501. In a specific embodiment, the clamping mechanism body 420 is connected to the torque sensor 322 by a screw.

When a solid vertebral pedicle screw is used, or when the guide pin 502 is not needed during the operation, the guide tube 501, the guide pin fixing mechanism and the guide pin clamping mechanism 420 can be omitted.

Figure 4:
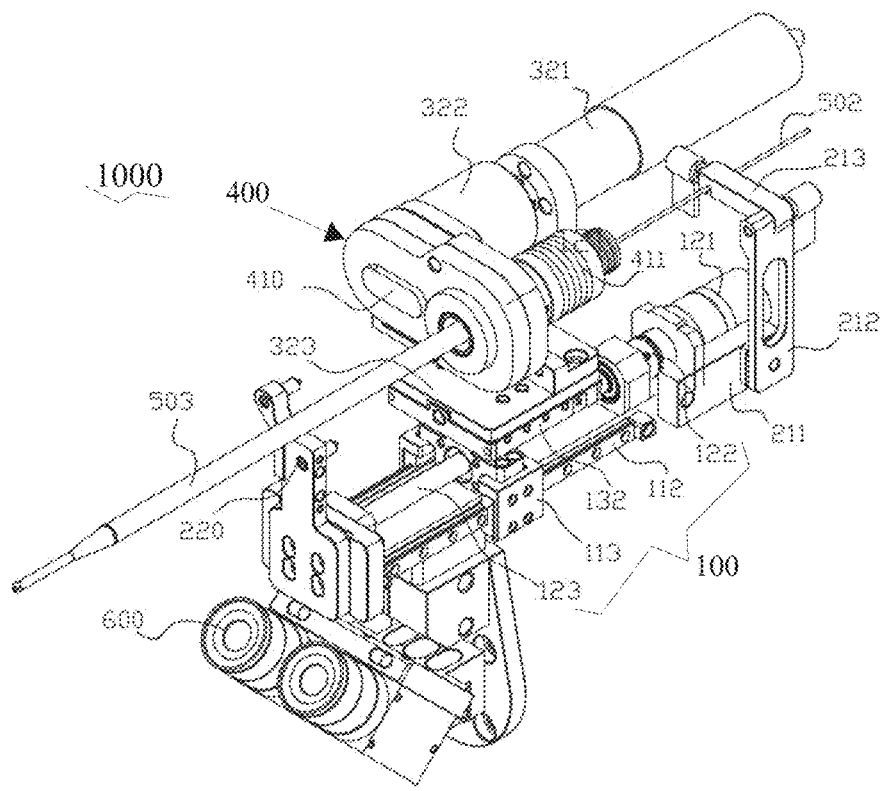
FIG. 4 is a schematic diagram of Embodiment 2 of the vertebral pedicle screw placement device of this application.
Figure 5:
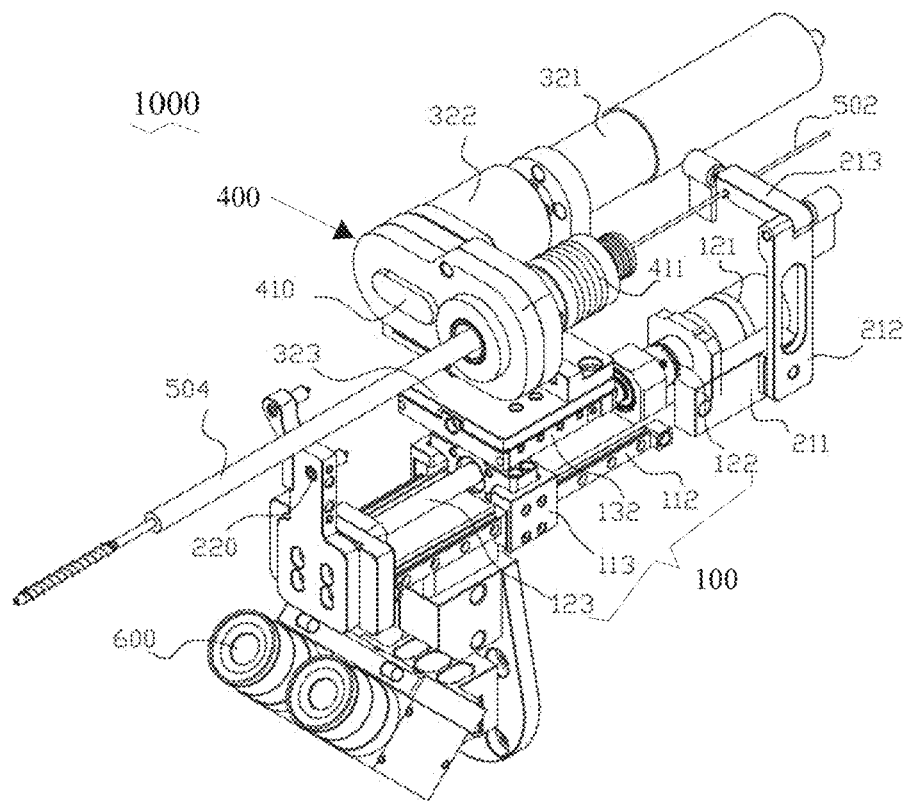
FIG. 5 is a schematic diagram of Embodiment 3 of the vertebral pedicle screw placement device of this application.
Figure 6:
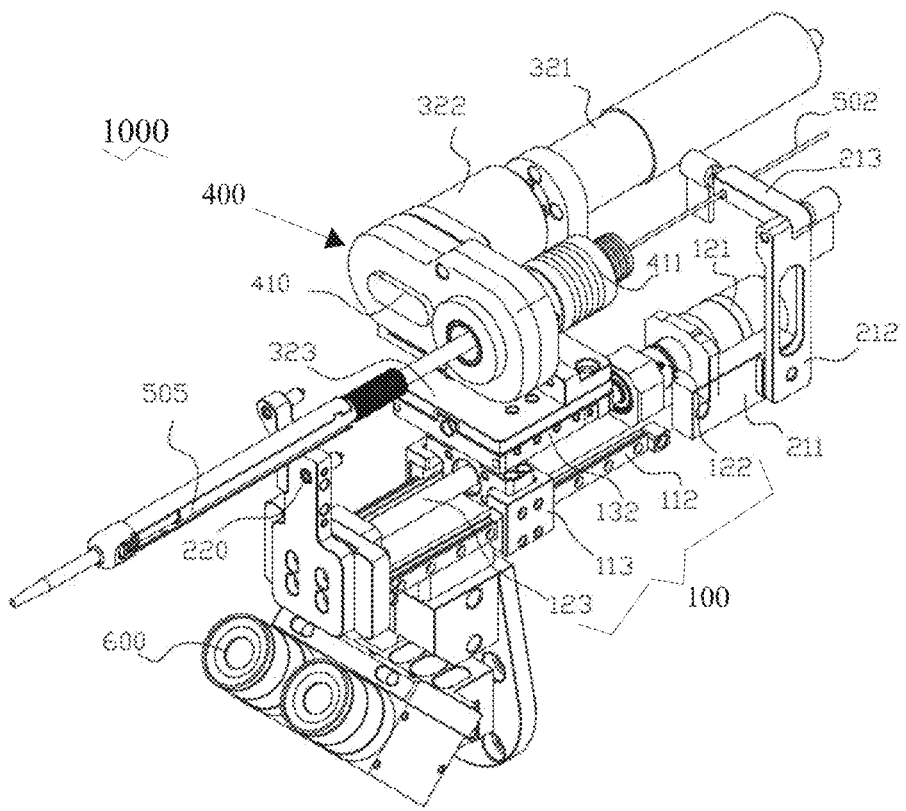
FIG. 6 is a schematic diagram of Embodiment 4 of the vertebral pedicle screw placement device of this application.

Please refer to FIGS. 4-6. The clamping mechanism is a three-in-one multifunctional clamping mechanism of reaming/tapping/screw setting, which includes a clamping mechanism body 410 and a quick-release joint 411. The clamping mechanism body 410 is connected with the torque sensor 322 and the bone drill motor 321. A reamer 503, a tap 504 and a screw placement driver 505 can be quickly connected to the clamping mechanism body 410 through the quick-release joint 411. In a specific embodiment, the clamping mechanism body 410 may be connected to the torque sensor 322 by a screw.

The process of vertebral pedicle screw placement generally includes: positioning, drilling a bottom hole, tapping, and screw placement. When the vertebral pedicle screw placement device 1000 of the present application is specifically applied, if a hollow vertebral pedicle screw is inserted, the vertebral pedicle screw placement device 1000 of the present application is used, and the guide pin fixing mechanism 210 is used to clamp and fix the guide pin 501. A front end of the guide pin 502 is inserted into the guide tube 501, and the guide pin 502 is inserted according to the surgical site and angle through the vertebral pedicle screw placement device 1000 of the present application. The guide pin is used to determine the position and angle of the vertebral pedicle screw, and to guide tools such as reamer, taps, and screws. Then use the reamer 503, and follow the guide pin to ream the surgical site. Then, use the tap 504 to tap along the reamed hole along the guide pin. Finally, a screw placement driver 505 is used to install the hollow screw, that is, the screw is inserted along the guide pin.

If a solid vertebral pedicle screw is inserted, using the vertebral pedicle screw placement device 1000 of the present application, the guide pin 501 is clamped and fixed by the guide pin fixing mechanism 210, and a front end of the guide pin 502 is inserted into the guide tube 501. First, through the vertebral pedicle screw placement device 1000 of the present application, the guide pin 502 is placed according to the surgical site and angle. Then install the reamer 503, and follow the guide pin to ream the surgical site. Then, change to tap 504, follow the guide pin, and tap along the reamed hole. Finally, remove the guide pin, use a screw placement driver 505 to install the solid screw, and place the screw along the tapped threaded hole. In the embodiments of FIGS. 3-6, a cross laser system 220 and a binocular camera 600 are provided. The cross laser system 220 is installed at the front end of the depth advancing mechanism 100, which can provide the doctor with an accurate position of the patient's skin incision. The binocular camera 600 is installed below the front end of the depth advancing mechanism 100, and is fixed to a lower side of the bottom plate 111 or a lower side of the guide rail 112 through a platform fixing seat 114. The binocular camera 600 is connected to a computer 700 and can perform tracking and identification and intraoperative monitoring.

Figure 7:
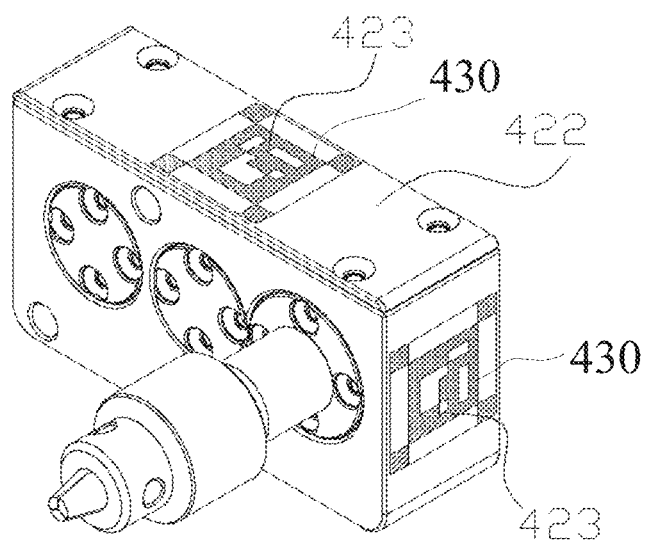
FIG. 7 is a schematic diagram of another embodiment of a guide pin clamping mechanism of the vertebral pedicle screw placement device of the present application.
Figure 8:
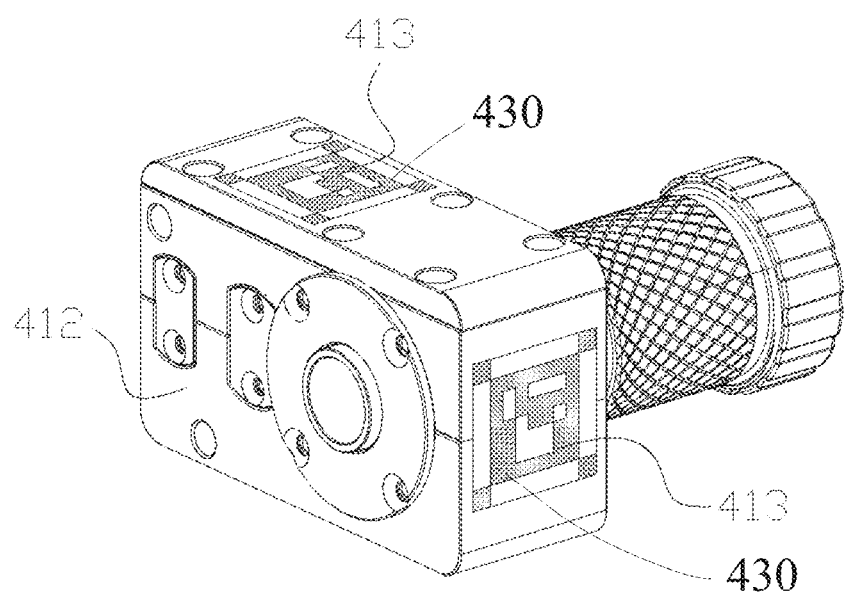
FIG. 8 is a schematic diagram of another embodiment of a multifunctional clamping mechanism of the vertebral pedicle screw placement device of the present application.

Please refer to FIGS. 7-9. In other embodiments, the binocular camera may not be set on the vertebral pedicle screw placement device 1000, but may be separately set on other brackets and connected to the computer 700. The clamping mechanism of the bone drill mechanism 400 adopts another embodiment. The clamping mechanism body 412, 422 is provided with navigation surfaces 413, 423, and the navigation surfaces 413, 423 are equipped with visible light visual recognition tracking patterns 430 adapted to the binocular vision system 60. Tracking and monitoring is performed by tracking the navigation surfaces on the intelligent vertebral pedicle screw placement device 1000.

The vertebral pedicle screw placement device 1000 further includes a control circuit for controlling the screw placement operation of the vertebral pedicle screw placement device 1000 and at the same time detecting the screw placement situation. Specifically, the control circuit can be connected to the computer 700 through RSS485 or CAN communication, and control various movements of the tool according to the preoperative planning. The vertebral pedicle screw placement device 1000 further includes an installation interface 601, which can install the vertebral pedicle screw placement device 1000 on a mechanical arm of an orthopedic surgical robot to realize intelligent semi-automatic screw placement operation.

The present application also provides a vertebral pedicle screw placement system 10, which includes the vertebral pedicle screw placement device 1000 and binocular vision system 60 as described above, and a computer 700. The binocular vision system 60 is connected to the computer 700.

Specifically, the binocular vision system 60 includes the binocular camera for realizing binocular visual spatial positioning, and the binocular camera is connected to the computer 700. The clamping mechanism of the bone drill mechanism 400 of the vertebral pedicle screw placement device 1000 is provided with a navigation surface, and the navigation surface is provided with a visible light visual recognition tracking pattern 430 adapted to a binocular vision system 60. The binocular vision system 60 is used to track the navigation surface of the intelligent vertebral pedicle screw placement device 1000 to realize tracking and monitoring.

The above are only preferred embodiments of the present application, and the protection scope of the present application is not limited thereto. Any equivalent transformation based on the technical solution of the present application shall fall within the protection scope of the present application.

What is claimed is:

1. A vertebral pedicle screw placement device, comprising:
    a bone drill mechanism, comprising:
        a bone drill driving device; and
        a clamping mechanism connected to and driven by the bone drill driving device; and
    a depth advancing mechanism connected to the bone drill mechanism and used to generate linear reciprocating motion, comprising:
        a lead screw assembly; comprising:
            a ball screw; and
            a lead screw nut;
        a moving platform; and
        a driving motor for driving the lead screw assembly;
    wherein the driving motor is connected to and drives the ball screw, so that a linear reciprocating relative movement occurs between the lead screw nut and the ball screw; the lead screw nut is connected with the moving platform, and the bone drill mechanism is installed on the moving platform.

2. The vertebral pedicle screw placement device according to claim 1, wherein the depth advancing mechanism further includes a linear guide rail and a sliding block, the sliding block can perform linear reciprocating relative movement along the linear guide rail, a relative position of the ball screw and the linear guide rail is fixed, and the lead screw nut is fixed on the sliding block.

3. The vertebral pedicle screw placement device according to claim 2, wherein the depth advancing mechanism further includes a coupling, and the driving motor drives the ball screw through the coupling to perform linear reciprocating motion.

4. The vertebral pedicle screw placement device according to claim 3, wherein the depth advancing mechanism further includes a bottom plate, the linear guide rail is fixedly installed with the bottom plate, a bearing is provided on the bottom plate, and the ball screw is installed in the bearing.

5. The vertebral pedicle screw placement device according to claim 4, wherein the bone drill mechanism further includes a mechanism mounting seat and a cross-roller guide rail; the bone drill driving device and the clamping mechanism are mounted on the mechanism mounting seat; the cross-roller guide rail is connected to the moving platform on the depth advancing mechanism; and the bone drill driving device and the clamping mechanism are connected with the moving platform through the mechanism mounting seat and the cross-roller guide rail.

6. The vertebral pedicle screw placement device according to claim 5, wherein the vertebral pedicle screw placement device further includes a pressure sensor and a buffer spring arranged between the bone drill mechanism and the moving platform of the depth advancing mechanism.

7. The vertebral pedicle screw placement device according to claim 5, wherein the bone drill mechanism further includes a torque sensor provided between the bone drill driving device and the clamping mechanism.

8. The vertebral pedicle screw placement device according to claim 1, wherein the clamping mechanism is a guide pin clamping mechanism, which includes a clamping mechanism body and a drill chuck, the clamping mechanism body is connected with the bone drill driving device, and the drill chuck is used for clamping a guide pin.

9. The vertebral pedicle screw placement device according to claim 1, wherein the clamping mechanism is a multifunctional clamping mechanism, which includes a clamping mechanism body and a quick release joint, and the clamping mechanism body is connected with the bone drill driving device.

10. The vertebral pedicle screw placement device according to claim 1, wherein the vertebral pedicle screw placement device also includes a cross laser system and a guide tube.

11. The vertebral pedicle screw placement device according to claim 10, wherein the cross laser system and the guide tube are installed at a front end of the depth advancing mechanism.

12. The vertebral pedicle screw placement device according to claim 1, wherein the vertebral pedicle screw placement device also includes a binocular camera installed at a front end of the depth advancing mechanism and connected to a computer.

13. The vertebral pedicle screw placement device according to claim 1, wherein the clamping mechanism of the bone drill mechanism is provided with a navigation surface.

14. A vertebral pedicle screw placement device comprising:
    a bone drill mechanism, comprising:
        a bone drill driving device, and
        a clamping mechanism connected to and driven by the bone drill driving device;
    a depth advancing mechanism connected to the bone drill mechanism and used to generate linear reciprocating motion, and
    a guide pin fixing mechanism for positioning the guide pin.

15. The vertebral pedicle screw placement device according to claim 14, wherein the guide pin fixing mechanism includes a fixing member, an extension arm, and a clamping arm, the fixing member and the depth advancing mechanism are relatively fixedly mounted, one end of the extension arm is mounted on the fixing member, and the clamping arm is mounted on the other end of the extension arm through a connecting shaft, the clamping arm is rotatable along the connecting shaft relative to the extension arm, and the clamping arm is provided with a clamping hole for clamping the guide pin.

16. The vertebral pedicle screw placement device according to claim 15, wherein the guide pin fixing mechanism further includes adjusting members respectively arranged on one side of the connecting shaft and the clamping hole.

17. A vertebral pedicle screw placement system, comprising:
 a vertebral pedicle screw placement device;
 a binocular vision system; and
 a computer;
 wherein the binocular vision system is connected to the computer; the vertebral pedicle screw placement device comprises:
 a bone drill mechanism; comprising:
  a bone drill driving device, and
  a clamping mechanism connected to and driven by the bone drill driving device; and
 a depth advancing mechanism connected to the bone drill mechanism and used to generate linear reciprocating motion; comprising:
  a lead screw assembly; comprising:
   a ball screw; and
   a lead screw nut;
  a moving platform; and
  a driving motor for driving the lead screw assembly;
 wherein the driving motor is connected to and drives the ball screw, so that a linear reciprocating relative movement occurs between the lead screw nut and the ball screw; the lead screw nut is connected with the moving platform, and the bone drill mechanism is installed on the moving platform.

18. The vertebral pedicle screw placement system according to claim 17, wherein the binocular vision system includes a binocular camera for spatial positioning of binocular vision, the binocular camera is connected to the computer, the clamping mechanism of the bone drill mechanism of the vertebral pedicle screw placement device is provided with a navigation surface, and the navigation surface is provided with a visible light visual recognition tracking pattern adapted to the binocular vision system.

* * * * *